(12) United States Patent
Wang et al.

(10) Patent No.: US 10,761,336 B2
(45) Date of Patent: Sep. 1, 2020

(54) DISPLAY DEVICE

(71) Applicants: BOE Technology Group Co., Ltd., Beijing (CN); Beijing BOE Optoelectronics Technology Co., Ltd., Beijing (CN)

(72) Inventors: Qian Wang, Beijing (CN); Xue Dong, Beijing (CN); Wenqing Zhao, Beijing (CN); Xiaochuan Chen, Beijing (CN); Jian Gao, Beijing (CN); Pengcheng Lu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 764 days.

(21) Appl. No.: 15/513,380

(22) PCT Filed: Aug. 5, 2016

(86) PCT No.: PCT/CN2016/093606
§ 371 (c)(1),
(2) Date: Mar. 22, 2017

(87) PCT Pub. No.: WO2017/118006
PCT Pub. Date: Jul. 13, 2017

(65) Prior Publication Data
US 2018/0231792 A1 Aug. 16, 2018

(30) Foreign Application Priority Data
Jan. 8, 2016 (CN) .......................... 2016 1 0013368

(51) Int. Cl.
*G02B 27/30* (2006.01)
*G02B 27/42* (2006.01)
(Continued)

(52) U.S. Cl.
CPC ......... *G02B 27/30* (2013.01); *G02B 27/4205* (2013.01); *G02B 30/26* (2020.01);
(Continued)

(58) Field of Classification Search
CPC ................ G02B 27/30; G02B 19/0014; G02B 19/0028; G02B 27/0966; G02B 5/045;
(Continued)

(56) References Cited

U.S. PATENT DOCUMENTS

2009/0109377 A1* 4/2009 Sawaki ................ G02B 5/3058
349/96
2013/0314649 A1 11/2013 Choi et al.
(Continued)

FOREIGN PATENT DOCUMENTS

CN 102243402 A 11/2011
CN 103676286 A 3/2014
(Continued)

OTHER PUBLICATIONS

Oct. 26, 2016—(WO)—International Search Report and Written Opinion Appn PCT/CN2016/093606 with English Tran.

*Primary Examiner* — William R Alexander
*Assistant Examiner* — Sharrief I Broome
(74) *Attorney, Agent, or Firm* — Banner & Witcoff, Ltd.

(57) ABSTRACT

A display device is provided. The display device comprises: a display panel; a collimation optical element located on a light emission side of the display panel and configured to modulate a first light emitted from the display panel into a collimated second light and emit the collimated second light; and a light modulation element located on a light emission side of the collimation optical element and configured to adjust an emission angle of the second light from the light modulation element. The first light emitted from the display panel is modulated into the collimated second light by the
(Continued)

collimation optical element, the emission angle of the second light emitting from the light modulation element is adjusted by the light modulation element, such that the direction of the emission light of the display device is controllable.

18 Claims, 8 Drawing Sheets

(51) Int. Cl.
    *G02F 1/13*         (2006.01)
    *G02F 1/1347*     (2006.01)
    *G02F 1/29*         (2006.01)
    *G02B 30/26*      (2020.01)
    *G02B 30/27*      (2020.01)
    *G02F 1/133*      (2006.01)
    *G02F 1/1343*     (2006.01)
    *G02F 1/1335*     (2006.01)

(52) U.S. Cl.
    CPC ........... *G02B 30/27* (2020.01); *G02F 1/1323* (2013.01); *G02F 1/1343* (2013.01); *G02F 1/13306* (2013.01); *G02F 1/13471* (2013.01); *G02F 1/29* (2013.01); *G02F 1/133526* (2013.01)

(58) Field of Classification Search
CPC ........... G02B 19/0057; G02B 19/0052; G02B 27/0025; G02B 27/0961; G02B 5/04; G02B 2027/0123; G02B 27/0172; G02B 2027/011; G02B 2027/0116; G02B 2207/123; G02B 27/0101; G02B 27/0905; G02B 27/0927; G02B 27/1006; G02B 27/283; H01S 5/005; H01S 5/02288; H01S 5/4012; H01S 5/02248; H01S 5/4025; H01S 3/005; H01S 5/02208; H01S 5/02284; H01S 5/423; H01S 3/094053; H01S 3/09415; H01S 3/1611; H01S 5/0071; H01S 5/02212; H01S 5/02252; H01S 5/02296; H01S 5/0687; H01S 5/4031; H01S 5/405; H01S 2301/203

See application file for complete search history.

(56) References Cited

U.S. PATENT DOCUMENTS

| | | | |
|---|---|---|---|
| 2014/0160381 A1* | 6/2014 | Wang | G02B 27/2214 349/15 |
| 2015/0362655 A1* | 12/2015 | Wang | G02B 6/0038 362/621 |
| 2016/0004128 A1* | 1/2016 | Wu | G02B 30/27 349/144 |
| 2016/0198150 A1* | 7/2016 | Meng | H04N 13/305 348/59 |

FOREIGN PATENT DOCUMENTS

| | | |
|---|---|---|
| CN | 104061533 A | 9/2014 |
| CN | 104678560 A | 6/2015 |
| CN | 104820292 A | 8/2015 |
| CN | 204903922 U | 12/2015 |
| CN | 205281069 U | 6/2016 |

\* cited by examiner view view
 1    2

DISPLAY DEVICE

The application is a U.S. National Phase Entry of International Application No. PCT/CN2016/093606 filed on Aug. 5, 2016, designating the United States of America and claiming priority to Chinese Patent Application No. 201610013368.0, filed on Jan. 8, 2016. The present application claims priority to and the benefit of the above-identified applications and the above-identified applications are incorporated by reference herein in their entirety.

TECHNICAL FIELD

Embodiments of the present disclosure relate to a display device.

BACKGROUND

At present, along with rapid development of a display technology, a display device can realize different display functions, such as a 3D display function, an anti-peep display function and the like. However, the user has more and more requirements on multi-functionalization of the display device, for example, the display device not only is required to have the 3D display function but also is required to have the anti-peep function, etc., that is, multiple functions are required to be realized on one display device. However, the current display device cannot meet the requirements of the user on multi-functionalization.

SUMMARY

According to embodiments of the disclosure, a display device is provided. The display device comprises: a display panel; a collimation optical element located on a light emission side of the display panel and configured to modulate a first light emitted from the display panel into a collimated second light and emit the collimated second light; and a light modulation element located on a light emission side of the collimation optical element and configured to adjust an emission angle of the second light from the light modulation element.

For example, the collimation optical element includes: a diffraction grating, configured to convert the first light incident onto the diffraction grating into a parallel light in which light rays are parallel to each other; a first covering layer located on a light emission side of the diffraction grating; and a second covering layer located on the first covering layer. A refractive index of the first covering layer is smaller than a refractive index of the second covering layer, and the first covering layer and the second covering layer are configured to collimate the parallel light emitted from the diffraction grating to obtain the second light.

For example, each sub-pixel unit in the display panel corresponds to one diffraction grating; or each column of sub-pixel units with the same color in the display panel corresponds to one diffraction grating; or each row of sub-pixel units with the same color in the display panel corresponds to one diffraction grating; or at least two sub-pixel units with different colors in the display panel correspond to one diffraction grating.

For example, the diffraction grating includes a grating surface and a plurality of groove surfaces located above the grating surface; for each groove surface, an included angle $r$ between the groove surface and the grating surface, a width $d$ of the groove surface and a wavelength $\lambda$ of light incident to the groove surface meet a formula:

$$2d^*\sin r = \lambda.$$

For example, a refractive index of the first covering layer is different from a refractive index of the diffraction grating.

For example, the light modulation element includes at least one first light modulation unit, the first light modulation unit includes: a first substrate, a second substrate, a first liquid crystal layer located between the first substrate and the second substrate, a first electrode and a second electrode, and by applying voltages to the first electrode and the second electrode, the emission angle of the second light is adjusted in a first direction.

For example, the first electrode and the second electrode are located between the first substrate and the second substrate.

For example, each first light modulation unit corresponds to at least one sub-pixel unit in the display panel.

For example, each first light modulation unit corresponds to at least one column of sub-pixel units in the display panel, or each first light modulation unit corresponds to at least one row of sub-pixel units in the display panel.

For example, after the voltages are applied to the first electrode and the second electrode in the first light modulation unit, an equivalent optical structure of the first light modulation unit is a liquid crystal prism or a liquid crystal lens.

For example, the light modulation element further includes at least one second light modulation unit disposed on the first light modulation unit, the second light modulation unit includes: a third substrate, a fourth substrate, a second liquid crystal layer located between the third substrate and the fourth substrate, a third electrode and a fourth electrode, and by applying voltages to the third electrode and the fourth electrode, the emission angle of the second light is adjusted in a second direction different from the first direction.

For example, the third electrode and the fourth electrode are located between the third substrate and the fourth substrate.

For example, each second light modulation unit corresponds to at least one sub-pixel unit in the display panel.

For example, each second light modulation unit corresponds to at least one column of sub-pixel units in the display panel, or each second light modulation unit corresponds to at least one row of sub-pixel units in the display panel.

For example, after the voltages are applied to the third electrode and the fourth electrode in the second light modulation unit, an equivalent optical structure of the second light modulation unit is a liquid crystal prism or a liquid crystal lens.

For example, the first electrode is a strip electrode, the third electrode is a strip electrode, and an arrangement direction of the first electrode and an arrangement direction of the third electrode are perpendicular to each other.

For example, the first electrode is a strip electrode, the fourth electrode is a strip electrode, and an arrangement direction of the first electrode and an arrangement direction of the fourth electrode are perpendicular to each other.

For example, the second electrode is a strip electrode, the third electrode is a strip electrode, and an arrangement direction of the second electrode and an arrangement direction of the third electrode are perpendicular to each other.

For example, the second electrode is a strip electrode, the fourth electrode is a strip electrode, and an arrangement direction of the second electrode and an arrangement direction of the fourth electrode are perpendicular to each other.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The embodiments of the present disclosure are further described in detail in combination with drawings of the specification. It should be understood that the embodiments explained herein are merely intended for describing and explaining the content of the present disclosure rather than limiting a scope of the present disclosure.

The embodiments of the present disclosure provide a display device, the display device comprises: a display panel; a collimation optical element located on a light emission side of the display panel and configured to modulate a first light emitted from the display panel into a collimated second light and emit the collimated second light; and a light modulation element located on a light emission side of the collimation optical element and configured to adjust an emission angle of the second light from the light modulation element.

In the embodiments of the present disclosure, the first light emitted from the display panel is modulated into the collimated second light by the collimation optical element, the emission angle of the second light emitting from the light modulation element is adjusted by the light modulation element, such that the direction of the emission light of the display device is controllable, and therefore, multi-functionalization of the display device is realized, for example, 3D display, dual vision display, anti-peep display, etc., are realized by the display device. In addition, the display device provided by the embodiments of the present disclosure is capable of focusing the emission light into left and right eyes of a viewer by the light modulation element at night or during dark display, the intensity of the light received by the left and right eyes is increased, and therefore, power consumption of the display device is reduced.

How the display device provided by the embodiments of the present disclosure realizes the functions of 3D display, dual vision display, low power consumption, anti-peep, and the like is explained by examples.

I. 3D Display

Figure 1:
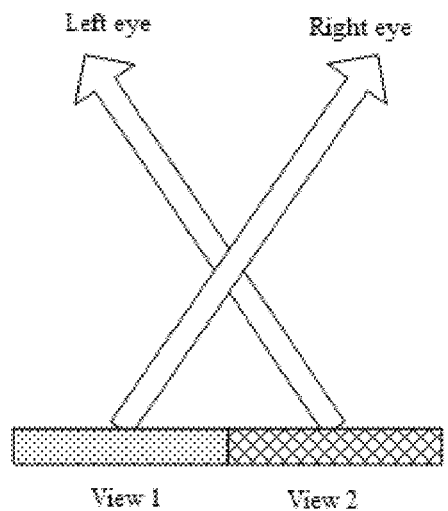
FIG. 1 is a schematic view illustrating that a display device provided by embodiments of the present disclosure is applied for 3D display.

For example, by using the light modulation element, emission angles of the emission light of two different groups of view information (i.e., view 1 and view 2) of the same image displayed in the display panel are adjusted, such that the emission light of the two different groups of view information of the same image is respectively emitted into the left eye and right eye of the viewer; as shown in FIG. 1, the emission light of the view 1 enters the right eye, the emission light of the view 2 enters the left eye, and such two different groups of view information form a 3D image by a brain of the viewer.

II. Dual Vision Display

Figure 2:
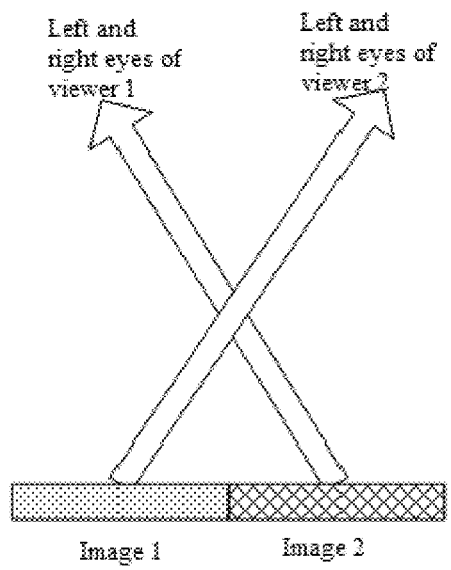
FIG. 2 is a schematic view illustrating that the display device provided by the embodiments of the present disclosure is applied for dual vision display.

For example, by using the light modulation element, emission angles of the emission light of different images displayed in the display panel are adjusted, such that the emission light of the different images is respectively emitted into the left and right eyes of different viewers; as shown in FIG. 2, the emission light of image 1 enters the left and right eyes of a viewer 2, the emission light of image 2 enters the left and right eyes of a viewer 1, such that the viewers in different positions view different images, and therefore, for example a vehicle-mounted dual vision display is realized. For example, by using the light modulation element, a range of the emission light of the display panel is adjusted, such that the range of the emission light is greater than a pupil distance of the viewer (the pupil distance is a distance between the pupil of the left eye and the pupil of the right eye of the viewer and generally is 65 mm), and therefore the left and right eyes of the same viewer view the same image. For example, by applying a high frequency (for example, 120 Hz) voltage signal to the light modulation element, an inclined angle of an equivalent optical structure of the light modulation element is adjusted, and therefore, the angle of the emission light is adjusted so as to realize adjustment of the range of the emission light of the display panel.

For example, during dual vision display, two adjacent pixel columns (rows) in the display panel respectively display the image 1 and image 2, that is, an image of the first column (row) of pixels is the image 1, an image of the second column (row) of pixels is the image 2, an image of the third column (row) of pixels is the image 1, an image of the fourth column (row) of pixels is the image 2, an image of the fifth column (row) of pixels is the image 1, an image of the sixth column (row) of pixels is the image 2, and the image 1 and image 2 are alternately displayed.

III. Anti-Peep Display

Figure 3:
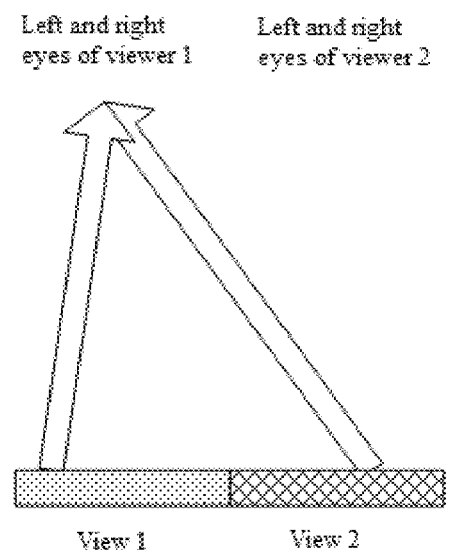
FIG. 3 is a schematic view illustrating that the display device provided by the embodiments of the present disclosure is applied for anti-peep display.

For example, by using the light modulation element, emission angles of all emission light of the display panel are adjusted, such that all emission light is emitted into the left eye and right eye of the viewer in a particular position; since no emission light is emitted into the left and right eyes of the viewers in other positions, the viewers in the other positions cannot view the image that the display displays; as shown in FIG. 3, all emission light enters the left and right eyes of the viewer 1, the viewer 2 cannot view the image that the display panel displays; and therefore, the anti-peep display function is realized.

Figure 4:
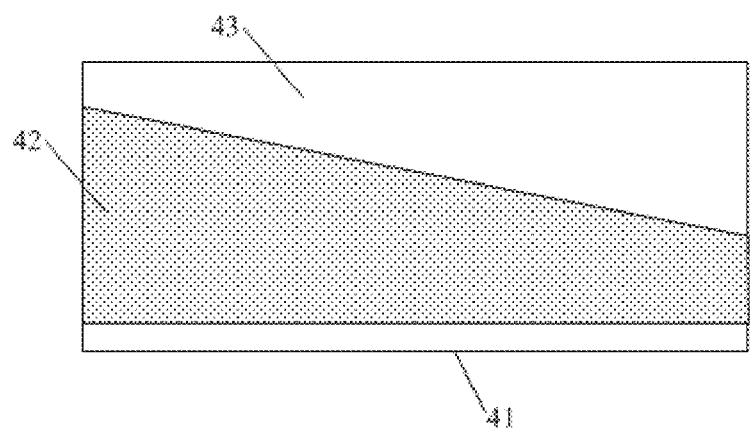
FIG. 4 is a structural schematic view of a collimation optical element in the display device provided by the embodiments of the present disclosure.

In the embodiments of the present disclosure, for example, the collimation optical element is shown in FIG. 4 and includes: a diffraction grating 41, configured to convert the first light incident onto the diffraction grating 41 into a parallel light in which the light rays are parallel to each other; a first covering layer 42 located on a light emission side of the diffraction grating 41; and a second covering layer 43 located on the first covering layer 42, a refractive index of the first covering layer 42 is less than that of the second covering layer 43, the first covering layer 42 and the second covering layer 43 are configured to collimate the parallel light emitted from the diffraction grating to obtain the second light.

Figure 6:
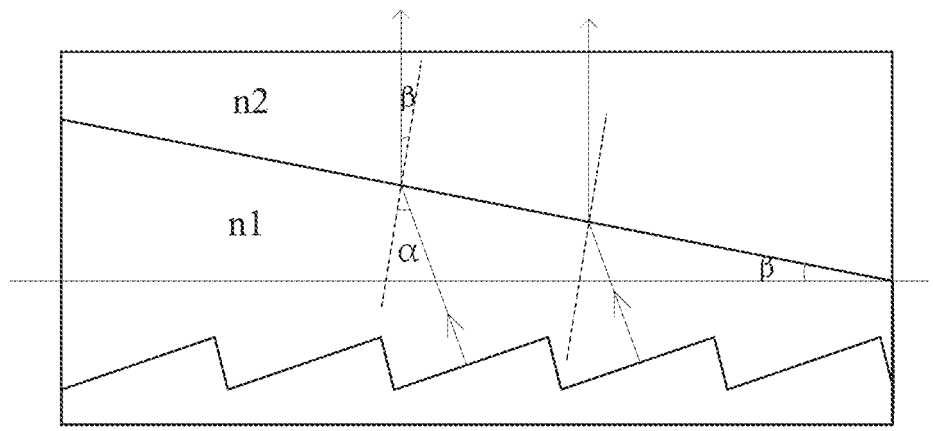
FIG. 6 is a principle schematic view of the collimation optical element in the display device provided by the embodiments of the present disclosure.

In the embodiments of the present disclosure, as shown in FIG. 6, by combining the diffraction grating, the first covering layer and the second covering layer with the high refractive index, the first light emitted from the display panel is modulated into the vertically upward collimated second light which is emitted.

In the embodiments of the present disclosure, for example, the collimation optical element includes at least one diffraction grating. The corresponding relationships between the diffraction grating and sub-pixel units in the display panel comprise one of the following four cases: each sub-pixel unit in the display panel corresponds to one diffraction grating; each column of sub-pixel units with the same color in the display panel corresponds to one diffraction grating; each row of sub-pixel units with the same color in the display panel corresponds to one diffraction grating; and at least two sub-pixel units with different colors in the display panel correspond to one diffraction grating.

For example, for an RGB pixel structure, each R (red) pixel, each G (green) pixel and each B (blue) pixel are respectively called as one sub-pixel unit, and the R pixel, the G pixel and the B pixel form the pixel unit; and for an RGBW pixel structure, each R (red) pixel, each G (green) pixel, each B (blue) pixel and each W (white) pixel are respectively called as one sub-pixel unit, and the R pixel, the G pixel, the B pixel and the W pixel form the pixel unit.

Figure 5:
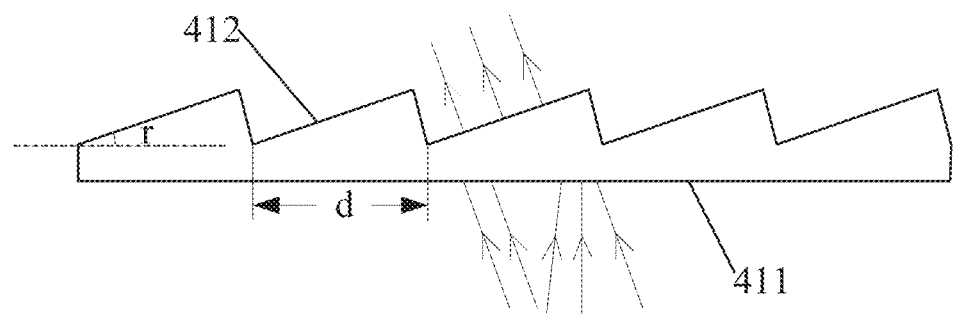
FIG. 5 is a structural schematic view of a diffraction grating in the display device provided by the embodiments of the present disclosure.

In the embodiments of the present disclosure, for example, the diffraction grating 41 is shown in FIG. 5 and includes: a grating surface 411 and a plurality of groove surfaces 412 located above the grating surface 411; for example, for each groove surface 412, an included angle between such groove surface 412 and the grating surface 411, a width of such groove surface 412 and a wavelength of light incident to such groove surface 412 meet a formula as follows:

$$2d^{*}\sin r=\lambda,$$

Where, d is the width of the groove surface, r is the included angle between the groove surface and the grating surface and $\lambda$ is the wavelength of the light incident to the groove surface.

For example, the diffraction grating is designed so that the parameters d and r of the diffraction grating corresponding to the sub-pixels with the same color are the same, and the parameters d and/or r of the diffraction grating corresponding to the sub-pixels with different colors are different. In the case that at least two sub-pixels units with different colors in the display panel correspond to one diffraction grating, d and r of the groove surface in the diffraction grating corresponding to the sub-pixels with the same color are the same, and the d and/or r of the groove surface in the diffraction grating corresponding to the sub-pixels with different colors are different, such that a diffraction action for the incident light of different wavelengths is realized and the emission light of the diffraction grating is a group of parallel light rays perpendicular to the groove surface.

In the embodiments of the present disclosure, for example, the first covering layer and the second covering layer are bonded with each other, a bonding surface between the first covering layer and the second covering layer is inclined, a light incident angle and a light emission angle at the bonding surface accord with a refraction law $n1^{*}\sin \alpha = n2^{*}\sin \beta$, where, n1 is the refractive index of the first covering layer, $\alpha$ is the light incident angle, n2 is the refractive index of the second covering layer, and $\beta$ is the light emission angle. Since n1<n2, the light emission angle $\beta$ is smaller than the light incident angle $\alpha$, such that the emission light is converged toward the center, for example, the emission light is converged to a direction perpendicular to the grating surface 411 so as to generate the emission light in the vertical direction, for example the emission light is perpendicular to the grating surface 411. As shown in FIG. 6, for example, an inclined angle of the bonding surface of the first covering layer and the second covering layer is β (that is, the included angle between the bonding surface and the light incident surface of the diffraction grating, i.e., the included angle between the bonding surface and the grating surface of the diffraction grating).

In the embodiments of the present disclosure, for example, the first covering layer and the diffraction grating are bonded with each other by optical adhesive, and the first covering layer and the second covering layer are bonded with each other by optical adhesive.

For example, the diffraction grating, the first covering layer and the second covering layer are of an integral structure. For example, the refractive index of the first covering layer is different from that of the diffraction grating, as shown in FIG. 6, such that the light incident to the first covering layer is a parallel light in which the light rays are parallel to each other and perpendicular to the groove surface of the diffraction grating.

For example, based on the embodiments described above, the light modulation element includes at least one first light modulation unit, the first light modulation unit includes a first substrate, a second substrate, a first liquid crystal layer located between the first substrate and the second substrate, a first electrode and a second electrode. For example, by applying voltages to the first electrode and the second electrode, the emission angle of the second light is adjusted in a first direction. For example, the first electrode and the second electrode are located between the first substrate and the second substrate.

For example, the first electrode is disposed on a side of the first substrate away from the second substrate, and/or the second electrode is disposed on a side of the second substrate away from the first substrate, which is not limited herein.

For example, the first electrode and the second electrode are both disposed on a same substrate; for example, the first electrode and the second electrode are both disposed on the first substrate, or the first electrode and the second electrode are both disposed on the second substrate. For example, the first electrode and the second electrode are disposed on different substrates respectively; for example, the first electrode is disposed on the first substrate, and the second electrode is disposed on the second substrate. The embodiments of the present disclosure do not limit the positions where the first electrode and the second electrode are disposed as long as an electric field is formed between the first substrate and the second substrate so as to adjust the emission angle of the second light.

In the embodiments of the present disclosure, for example, the first electrode is a strip electrode, the second electrode is not limited in shape and for example is a strip electrode or a plate electrode; or, the second electrode is a strip electrode, the first electrode is not limited in shape and for example is a strip electrode or a plate electrode. For example, the first electrode and the second electrode are both strip electrodes, and the first electrode and the second electrode are parallel with each other.

Figure 7:
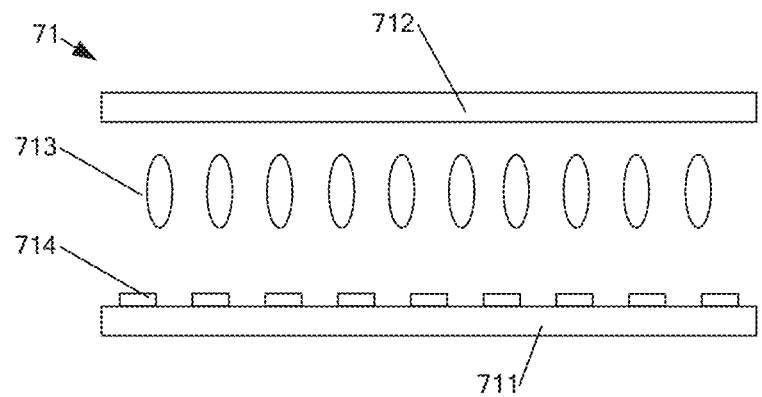
FIG. 7 is a structural schematic view of a light modulation element in the display device provided by the embodiments of the present disclosure.

FIG. 7 is a structural schematic view of the first light modulation unit, the first light modulation unit 71 includes the first substrate 711, the second substrate 712 and the first liquid crystal layer 713 located between the first substrate 711 and the second substrate 712. The first substrate 711 is located on a light emission side of the collimation optical element, and the first substrate 711 is provided with a plurality of first electrodes 714 at intervals and each first electrode 714 is a strip electrode. The second substrate 712 is provided with a plurality of strip electrodes at intervals or a plate electrode (not shown in FIG. 7), such that an electric field is formed between the second substrate and the first substrate.

In the embodiments of the present disclosure, for example, each first light modulation unit corresponds to at least one sub-pixel unit in the display panel.

For example, each first light modulation unit corresponds to at least one column of sub-pixel units in the display panel, or each first light modulation unit corresponds at least one row of sub-pixel units in the display panel.

Figure 8A:
FIG. 8A is a schematic view of a first corresponding relationship of the light modulation elements and sub-pixel units of a display panel in the display device provided by the embodiments of the present disclosure.
Figure 8B:
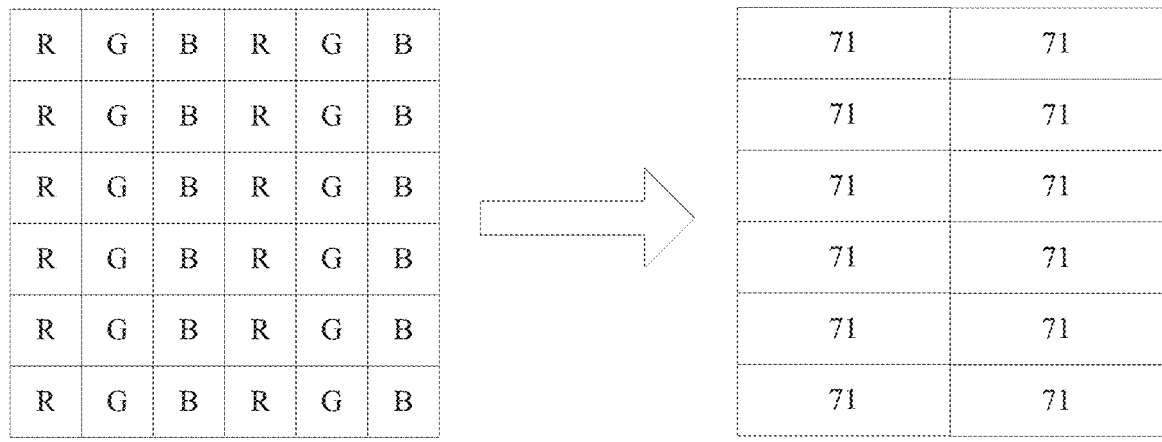
FIG. 8B is a schematic view of a second corresponding relationship of the light modulation elements and the sub-pixel units of the display panel in the display device provided by the embodiments of the present disclosure.
Figure 8C:
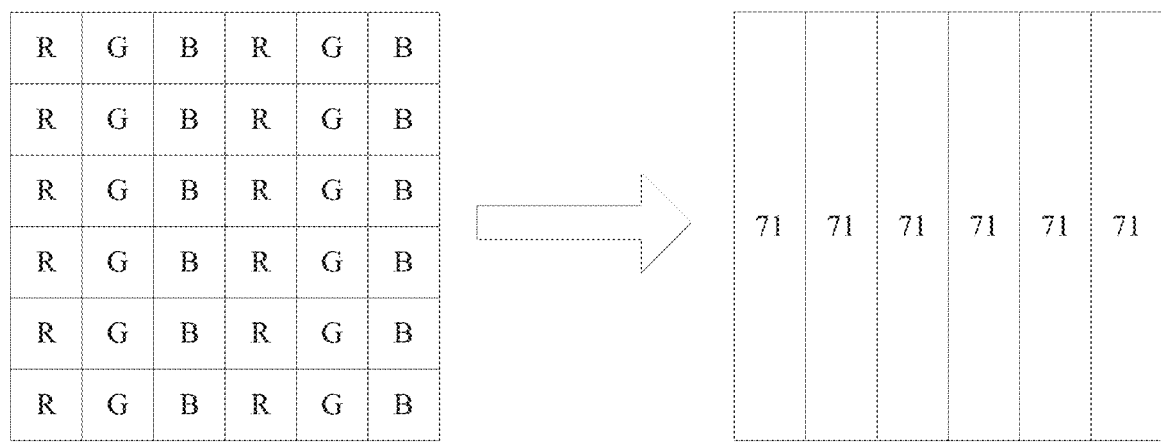
FIG. 8C is a schematic view of a third corresponding relationship of the light modulation elements and the sub-pixel units of the display panel in the display device provided by the embodiments of the present disclosure.
Figure 8D:
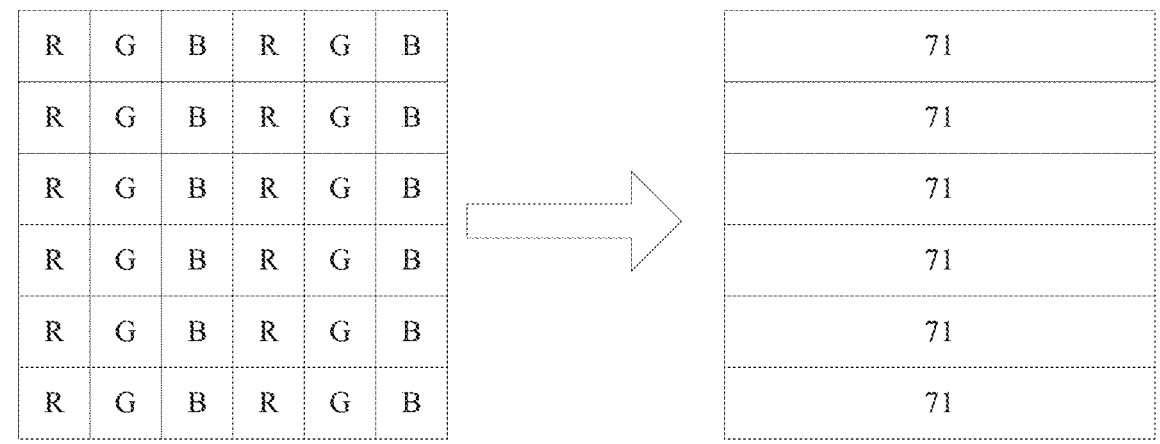
FIG. 8D is a schematic view of a fourth corresponding relationship of the light modulation elements and the sub-pixel units of the display panel in the display device provided by the embodiments of the present disclosure.

For example, each first light modulation unit corresponds to one sub-pixel unit in the display panel, that is, the first light modulation units correspond to the sub-pixel units in the display panel one to one, as shown in FIG. 8A, so as to realize the adjustment of the emission angle of the emission light of the sub-pixel units. For example, each first light modulation unit corresponds to one pixel unit in the display panel, as shown in FIG. 8B, so as to realize the adjustment of the emission angle of the emission light of the pixel units, wherein each pixel unit includes one R pixel, one G pixel and one B pixel. For example, each first light modulation unit corresponds to one column of sub-pixel units in the display panel, as shown in FIG. 8C, so as to realize the adjustment of the emission angle of the emission light of such column of sub-pixel units. For example, each first light modulation unit corresponds to one row of sub-pixel units in the display panel, as shown in FIG. 8D, so as to realize the adjustment of the emission angle of the emission light of such row of sub-pixel units. Of course, the embodiments of the present disclosure are not limited to the above four corresponding relationships, each first light modulation unit for example corresponds to a plurality of sub-pixel units in the display panel, or corresponds to a plurality of pixel units in the display panel. It needs to be noted that the less the number of the sub-pixel units corresponding to each light modulation unit, the finer the adjustment of the emission angle of the emission light of the display panel.

Figure 9A:
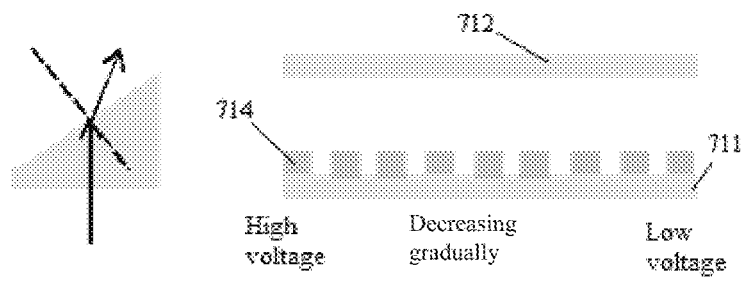
FIG. 9A is a schematic view I of an equivalent optical structure of a first light modulation unit in the display device provided by the embodiments of the present disclosure.
Figure 9B:
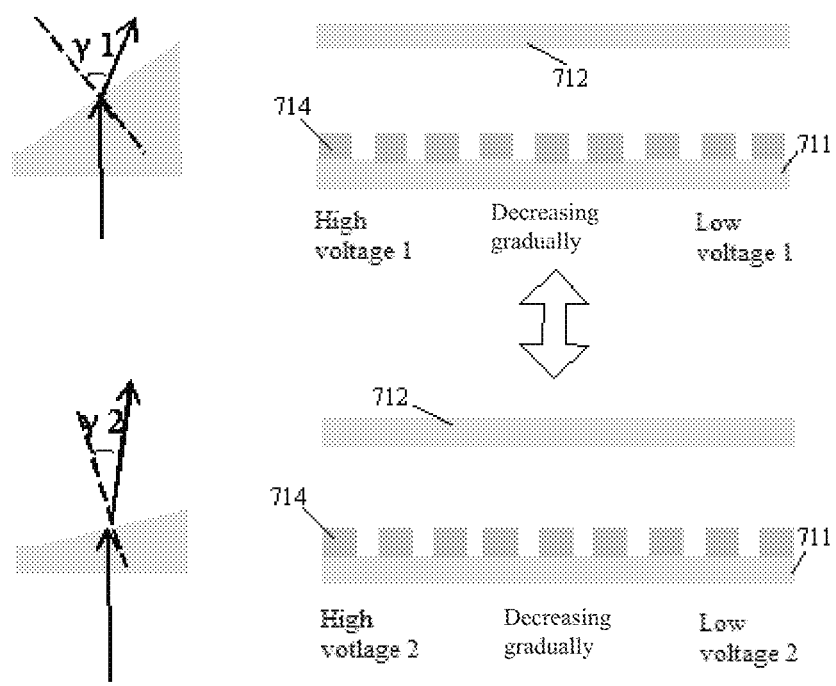
FIG. 9B is a schematic view II of the equivalent optical structure of the first light modulation unit in the display device provided by the embodiments of the present disclosure.
Figure 9C:
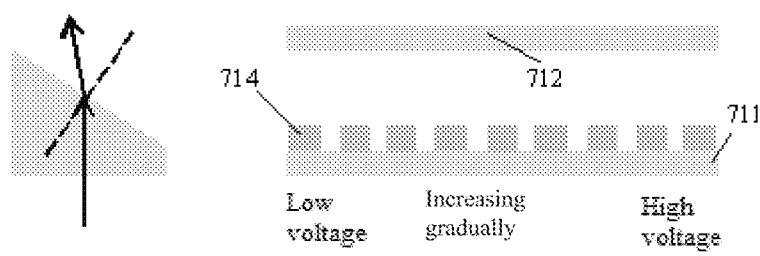
FIG. 9C is a schematic view III of the equivalent optical structure of the first light modulation unit in the display device provided by the embodiments of the present disclosure.
Figure 9D:
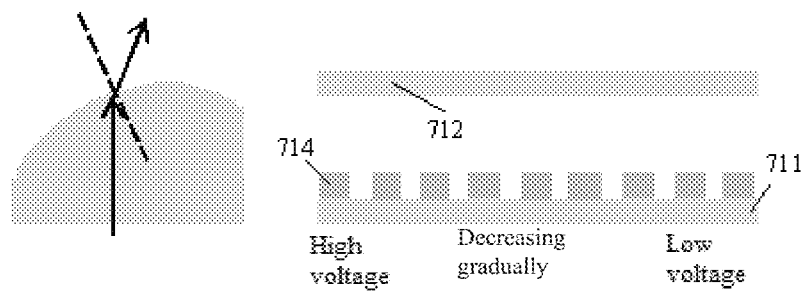
FIG. 9D is a schematic view IV of the equivalent optical structure of the first light modulation unit in the display device provided by the embodiments of the present disclosure.

In the embodiments of the present disclosure, for example, an equivalent optical structure of the first light modulation unit after the voltage is applied to the first electrode and the second electrode is a liquid crystal prism or liquid crystal lens. By taking the first light modulation unit shown in FIG. 7 as an example, liquid crystal in the first liquid crystal layer in the first light modulation unit adopts an Electrically Controlled Birefringence (ECB) mode, and for example, the same voltage is applied to the second electrode on the second substrate. As shown in FIG. 9A, the voltages applied to the first strip electrodes 714 in the first light modulation unit are reduced gradually and the voltages applied to the first strip electrodes 714 are linearly adjusted, so that the equivalent optical structure of the first light modulation unit is the liquid crystal prism and a rightward light control is realized, i.e., the light is deflected rightward. For example, different voltages are applied to different first light modulation units, so that the deflection angles of the emission light of the different first light modulation units are different. As shown in upper portion of FIG. 9B, the voltages applied to the first strip electrodes 714 in the first light modulation unit are reduced gradually from a high voltage 1 to a low voltage 1, the emission angle of the emission light of the first light modulation unit is γ1; as shown in lower portion of FIG. 9B, the voltages applied to the first strip electrodes 714 in the first light modulation unit are reduced gradually from a high voltage 2 to a low voltage 2, the emission angle of the emission light of the first light modulation unit is γ2, for example, a voltage difference between the high voltage 1 and the low voltage 1 is greater than a voltage difference between the high voltage 2 and the low voltage 2; from the drawing, it can be seen that γ1>γ2. Still taking the first light modulation unit in FIG. 7 as an example, the voltages applied to the first strip electrodes 714 in the first light modulation unit are increased gradually and the voltages applied to the first strip electrodes 714 are linearly adjusted, so that the equivalent optical structure of the first light modulation unit is also the liquid crystal prism and a leftward light control is realized, i.e., the light is deflected leftward, as shown in FIG. 9C. For example, the voltages applied to the first strip electrodes 714 are nonlinearly adjusted, then the equivalent optical structure of the first light modulation unit is the liquid crystal lens, as shown in FIG. 9D, the voltages applied to the first strip electrodes 714 in the first light modulation unit are reduced gradually and the voltages applied to the first strip electrodes 714 are nonlinearly adjusted, so that the equivalent optical structure of the first light modulation unit is the liquid crystal lens and rightward or leftward light control is realized.

Figure 10A:
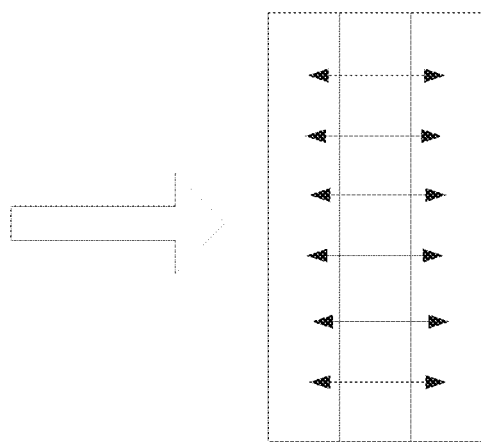
FIG. 10A is a schematic view illustrating that an emission light is modulated in a horizontal direction by the first optical modulation unit in the display device provided by the embodiments of the present disclosure.
Figure 10B:
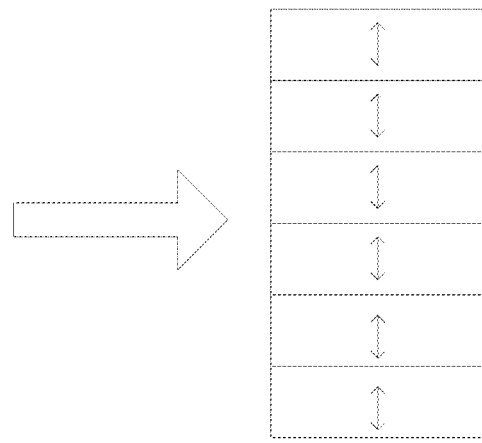
FIG. 10B is a schematic view illustrating that the emission light is modulated in a vertical direction by the first optical modulation unit in the display device provided by the embodiments of the present disclosure.

In the embodiments of the present disclosure, for example, an arrangement direction of the first strip electrodes in the first light modulation unit is parallel with a column direction of the sub-pixels in the display panel, then the adjustment of the emission angle of the second light in the first direction is modulation of the emission light in a horizontal direction, i.e., the emission light is subjected to leftward and rightward modulation, as shown in FIG. 10A; for example, the arrangement direction of the first strip electrodes in the first light modulation unit is parallel with a row direction of the sub-pixels in the display panel, then the adjustment of the emission angle of the second light in the first direction is modulation of the emission light in a vertical direction, i.e., the emission light is subjected to upward and downward modulation, as shown in FIG. 10B.

For example, the light modulation element in the embodiments of the present disclosure further includes at least one second light modulation unit disposed on the first light modulation unit, the second light modulation unit includes a third substrate, a fourth substrate, a second liquid crystal layer located between the third substrate and the fourth substrate, a third electrode and a fourth electrode. By applying voltages to the third electrode and the fourth electrode, the emission angle of the second light is adjusted in a second direction different from the first direction. Therefore, the emission angle of the second light are adjusted in different directions (that is, the first direction and second direction) by the first light modulation unit and the second light modulation unit.

For example, the third electrode and the fourth electrode are located between the third substrate and the fourth substrate.

For example, the third electrode is disposed on a side of the third substrate away from the fourth substrate, and/or the fourth electrode is disposed on a side of the fourth substrate away from the third substrate, which is not limited herein.

For example, the first direction is the horizontal direction, that is, the first light modulation unit performs leftward and rightward modulation on the second light, and the second direction is the vertical direction, that is, the second light modulation unit performs upward and downward modulation on the second light. For example, the first direction is the vertical direction, that is, the first light modulation unit performs upward and downward modulation on the second light, and the second direction is the horizontal direction, that is, the second light modulation unit performs leftward and rightward modulation on the second light.

For example, the first electrode is a strip electrode, the third electrode is a strip electrode, and an arrangement direction of the first electrode and an arrangement direction of the third electrode are perpendicular to each other.

For example, the first electrode is a strip electrode, the fourth electrode is a strip electrode, and the arrangement direction of the first electrode and an arrangement direction of the fourth electrode are perpendicular to each other.

For example, the second electrode is a strip electrode, the third electrode is a strip electrode, and an arrangement direction of the second electrode and the arrangement direction of the third electrode are perpendicular to each other.

For example, the second electrode is a strip electrode, the fourth electrode is a strip electrode, and the arrangement direction of the second electrode and the arrangement direction of the fourth electrode are perpendicular to each other.

In the embodiments of the present disclosure, each second light modulation unit corresponds to at least one sub-pixel unit in the display panel.

For example, each second light modulation unit corresponds to at least one column of sub-pixel units in the display panel, or each second light modulation unit corresponds to at least one row of sub-pixel units in the display panel.

In the embodiments of the present disclosure, for example, the third electrode is a strip electrode, different voltages are applied to the third strip electrodes in the second light modulation unit, the voltages applied to the third strip electrodes are linearly or nonlinearly adjusted, such that the second light modulation unit is equivalent to the liquid crystal prism or the liquid crystal lens.

Since the structure of the second light modulation unit is similar to that of the first light modulation unit, which specifically refers to related description in the first light modulation unit and is not repeated herein.

Figure 11:
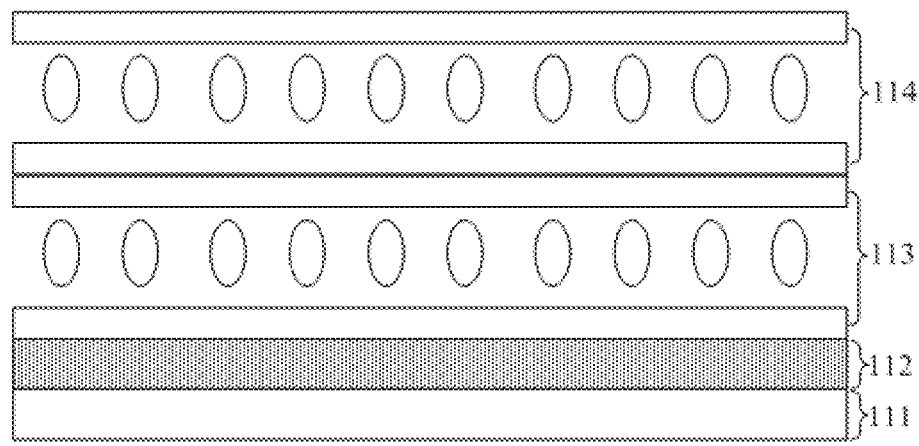
FIG. 11 is a schematic view of the display device provided by the embodiments of the present disclosure.

In the embodiments of the present disclosure, for example, the light modulation element includes the first light modulation unit and the second light modulation unit, the display device is shown in FIG. 11 and includes the display panel 111; the collimation optical element 112 located on the light emission side of the display panel 111; the first light modulation unit 113 located on the light emission side of the collimation optical element 112, the first light modulation unit 113 being configured to modulate the emission angle of the second light in the first direction, for example, modulate the second light in the horizontal direction; the second light modulation unit 114 located on the light emission side of the first light modulation unit 113, the second light modulation unit 114 being configured to modulate the emission angle of the second light in the second direction, for example, modulate the second light in the vertical direction.

By taking the display device shown in FIG. 11 as an example, the realization of 3D display and dual vision display by the display device is explained below in detail.

1. Application in 3D Display

Figure 12A:
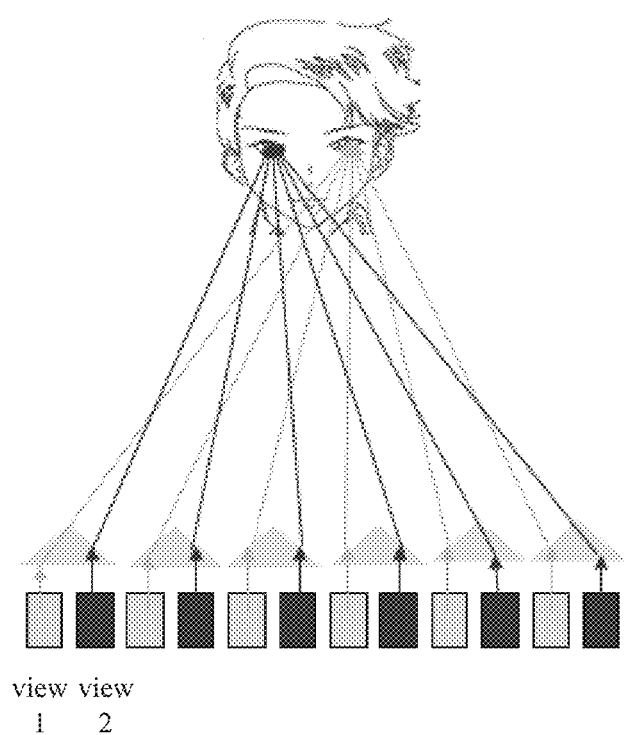
FIG. 12A is a schematic view illustrating that the display device shown in FIG. 11 is applied for 3D display.
Figure 12B:
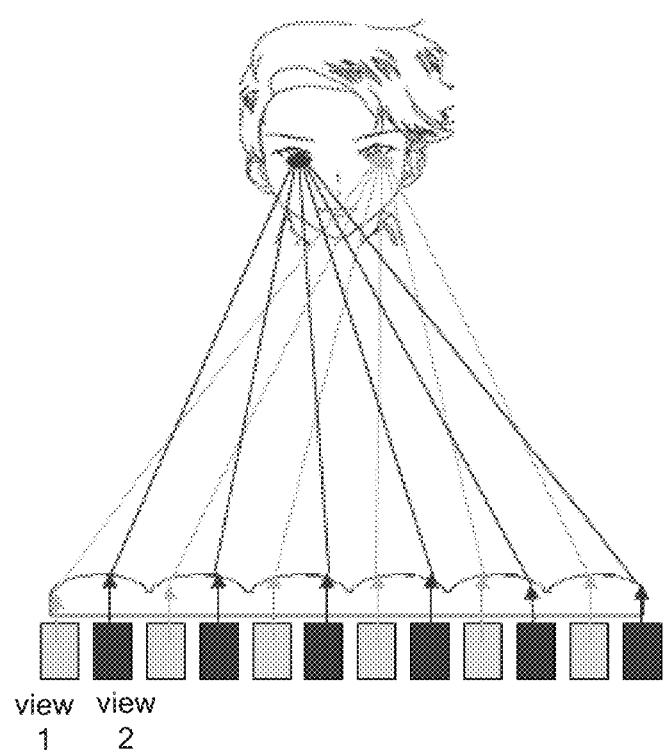
FIG. 12B is another schematic view illustrating that the display device shown in FIG. 11 is applied for 3D display.

During the viewer views the display device, the positions of the viewer's eyes and the positions of the sub-pixels in the display device are not on a same plane. For example, an incident angle upon the emission light of the display device is incident to the viewer's eyes is adjusted by the first light modulation unit, such that the viewer's eyes receive the light emitted from different sub-pixels. Then, for example, the refractive index distribution of the second liquid crystal layers in two adjacent second light modulation units presents a form of the liquid crystal prism (that is, the equivalent optical structure of each second light modulation unit is the liquid crystal prism like the prism structure in FIG. 12A), or the refractive index distribution of the second liquid crystal layers in two adjacent second light modulation units presents a form of the liquid crystal lens (that is, the equivalent optical structure of each second light modulation unit is the liquid crystal lens like the lens structure in FIG. 12B), so as to adjust the emission angle of the emission light of two different groups of view information (i.e., the view 1 and view 2) of the same image that the display panel displays. Therefore, the emission light of the two different groups of view information of the same image is emitted into the left eye and right eye of the viewer respectively, that is, the emission light of the view 1 enters the right eye and the emission light of the view 2 enters the left eye, in this way, the two different groups of view information form a 3D image through the brain of the viewer. For example, the liquid crystal prisms equivalent to different second light modulation units in FIG. 12A are different in incline angle, and the liquid crystal lenses equivalent to different second light modulation units in FIG. 12B are different in focal point.

For example, the emission angles of the emission light of two different groups of view information (i.e., view 1 and view 2) of the same image that the display panel displays are adjusted by two adjacent first light modulation units at first, such that the emission light of two different groups of view information of the same image is respectively emitted into the left eye and right eye of the viewer to form the 3D image; then the incident angle upon the emission light of the display device is incident to the viewer's eyes is adjusted by the second light modulation unit, such that the viewer's eyes receive the light emitted from different sub-pixels.

2. Application in Dual Vision Display

During the viewer views the display device in the dual vision display, the positions of the viewer's eyes and the positions of the sub-pixels in the display device are not on a same plane. For example, the incident angle upon the emission light of the display device is incident to the viewer's eyes are adjusted by the first light modulation unit at first, such that the viewer's eyes receive the light emitted from different sub-pixels. Then, by two adjacent second light modulation units, the emission angle of the emission light of different images in the display panel is adjusted, such that the emission light of different images is respectively emitted into the left and right eyes of different viewers.

For example, by two adjacent first light modulation units, the emission angle of the emission light of different images in the display panel is adjusted at first, such that the emission light of different images is respectively emitted into the left and right eyes of different viewers; then the incident angle upon the emission light of the display device is incident into the viewer's eyes is adjusted by the second light modulation unit, such that the viewer's eyes receive the light emitted from different sub-pixels.

Although the embodiments of the present disclosure have been disclosed, those skilled in the art can make other changes and modifications on these embodiments once learning a basic inventive concept. Therefore, the appended claims are intended to comprise the preferred embodiments and all changes and modifications falling within the scope of the present disclosure.

It is evident that a person skilled in the art can make various changes or modifications to the present disclosure without departing from the spirit and scope of the present disclosure. Thus, if such changes and modifications to the present disclosure are within the scope of the claims of the present disclosure and equivalent thereof, the present disclosure also intends to include all such changes and modifications within its scope.

The application claims priority of Chinese Patent Application No. 201610013368.0 filed on Jan. 8, 2016, the disclosure of which is incorporated herein by reference in its entirety as part of the present application.

The invention claimed is:

1. A display device, comprising:
a display panel;
a collimation optical element located on a light emission side of the display panel and configured to modulate a first light emitted from the display panel into a collimated second light and emit the collimated second light; and
a light modulation element located on a light emission side of the collimation optical element and configured to adjust an emission angle of the second light from the light modulation element, wherein
the collimation optical element includes: a diffraction grating, configured to convert a first light incident onto the diffraction grating into a parallel light in which light rays are parallel to each other; a first covering layer located on a light emission side of the diffraction grating; and a second covering layer located on the first covering layer;
a refractive index of the first covering layer is smaller than a refractive index of the second covering layer, and the first covering layer and the second covering layer are configured to collimate the parallel light emitted from the diffraction grating to obtain the second light;
each of the diffraction rating, the first covering layer, and the second covering layer is provided on the light emission side of the display panel; and
the first light emitted from the display panel is not perpendicular to a surface of the diffraction grating facing the display panel, but the collimated second light emitted by the collimation optical element is perpendicular to the surface of the diffraction grating facing the display panel.

2. The device according to claim 1, wherein
each sub-pixel unit in the display panel corresponds to one diffraction grating; or
each column of sub-pixel units with the same color in the display panel corresponds to one diffraction grating; or
each row of sub-pixel units with the same color in the display panel corresponds to one diffraction grating; or
at least two sub-pixel units with different colors in the display panel correspond to one diffraction grating.

3. The device according to claim 1, wherein
the diffraction grating includes a grating surface and a plurality of groove surfaces located above the grating surface;
for each groove surface, an included angle r between the groove surface and the grating surface, a width d of the groove surface and a wavelength λ of light incident to the groove surface meet a formula:

$$2d^*\sin r=\lambda.$$

4. The device according to claim 1, wherein the refractive index of the first covering layer is different from a refractive index of the diffraction grating.

5. The device according to claim 1, wherein
the light modulation element includes at least one first light modulation unit, the first light modulation unit includes: a first substrate, a second substrate, a first liquid crystal layer located between the first substrate and the second substrate, a first electrode, and a second electrode, and by applying voltages to the first electrode and the second electrode, the emission angle of the second light is adjusted in a first direction.

6. The device according to claim 5, wherein the first electrode and the second electrode are located between the first substrate and the second substrate.

7. The device according to claim 5, wherein each first light modulation unit corresponds to at least one sub-pixel unit in the display panel.

8. The device according to claim 7, wherein each first light modulation unit corresponds to at least one column of sub-pixel units in the display panel, or each first light modulation unit corresponds to at least one row of sub-pixel units in the display panel.

9. The device according to claim 5, wherein after the voltages are applied to the first electrode and the second electrode in the first light modulation unit, an equivalent optical structure of the first light modulation unit is a liquid crystal prism or a liquid crystal lens.

10. The device according to claim 5, wherein the light modulation element further includes at least one second light modulation unit disposed on the first light modulation unit, the second light modulation unit includes: a third substrate, a fourth substrate, a second liquid crystal layer located between the third substrate and the fourth substrate, a third electrode, and a fourth electrode, and by applying voltages to the third electrode and the fourth electrode, the emission angle of the second light is adjusted in a second direction different from the first direction.

11. The device according to claim 10, wherein the third electrode and the fourth electrode are located between the third substrate and the fourth substrate.

12. The device according to claim 10, wherein each second light modulation unit corresponds to at least one sub-pixel unit in the display panel.

13. The device according to claim 12, wherein each second light modulation unit corresponds to at least one column of sub-pixel units in the display panel, or each second light modulation unit corresponds to at least one row of sub-pixel units in the display panel.

14. The device according to claim 10, wherein after the voltages are applied to the third electrode and the fourth electrode in the second light modulation unit, an equivalent optical structure of the second light modulation unit is a liquid crystal prism or a liquid crystal lens.

15. The device according to claim 10, wherein the first electrode is a strip electrode, the third electrode is a strip electrode, and an arrangement direction of the first electrode and an arrangement direction of the third electrode are perpendicular to each other.

16. The device according to claim 10, wherein the first electrode is a strip electrode, the fourth electrode is a strip electrode, and an arrangement direction of the first electrode and an arrangement direction of the fourth electrode are perpendicular to each other.

17. The device according to claim 10, wherein the second electrode is a strip electrode, the third electrode is a strip electrode, and an arrangement direction of the second electrode and an arrangement direction of the third electrode are perpendicular to each other.

18. The device according to claim 10, wherein the second electrode is a strip electrode, the fourth electrode is a strip electrode, and an arrangement direction of the second electrode and an arrangement direction of the fourth electrode are perpendicular to each other.

* * * * *